United States Patent [19]

Asano

[11] Patent Number: 5,388,901
[45] Date of Patent: Feb. 14, 1995

[54] STORAGE DEVICE FURNISHED WITH SAFETY FUNCTION

[75] Inventor: Kazunori Asano, Kamakura, Japan

[73] Assignee: Kato Hatsujo Kaisha, Ltd., Yokohama, Japan

[21] Appl. No.: 28,152

[22] Filed: Mar. 9, 1993

[30] Foreign Application Priority Data

Mar. 16, 1992 [JP] Japan .................. 4-089294

[51] Int. Cl.$^6$ .............................................. E05C 19/02
[52] U.S. Cl. .................. 312/222; 312/319.1; 292/219; 292/DIG. 22; 296/37.12
[58] Field of Search ........................... 312/319.1, 222; 292/219, DIG. 22; 296/37.9, 37.12

[56] References Cited

U.S. PATENT DOCUMENTS

| | | | |
|---|---|---|---|
| 4,595,993 | 6/1986 | Yao | 312/333 X |
| 4,596,427 | 6/1986 | Pflugfelder | 312/333 X |
| 4,635,763 | 1/1987 | Omata | 312/319.1 X |
| 5,052,728 | 10/1991 | Fukumoto | 292/DIG. 22 X |
| 5,090,751 | 2/1992 | Kobayashi | 292/DIG. 22 X |

FOREIGN PATENT DOCUMENTS

| | | | |
|---|---|---|---|
| 2549123 | 1/1985 | France | 296/37.9 |
| 2-25332 | 2/1990 | Japan . | |

Primary Examiner—Kenneth J. Dorner
Assistant Examiner—David E. Allred
Attorney, Agent, or Firm—Wenderoth, Lind & Ponack

[57] ABSTRACT

In a push-open type storing device for use in an automobile which enables a storing box to be locked in the shut position inside a housing in spite of the biasing spring pressure owing to the operation of a cam member on the housing side and a pin member on the storing box side and further enables the storing box to be automatically moved in the opening direction out of the housing through the opening thereof in response to a further push given to the storing box, the storing device with a safety function produced by forming a locking part and an outlet mouth as separated with a distance from each other on one edge side defining a cam groove of the cam member, integrally forming a projecting stopper guide wall between the locking part and the outlet mouth on the other edge side opposite the one edge side mentioned above, and allowing the locking part for securing the pinmember to be positioned outwardly from the stopper guide wall, enables the pin member to collide against the outer edge of the stopper guide wall and prevents the storing box from being thrust out of the housing when the storing device is exposed to a large inertial force.

12 Claims, 9 Drawing Sheets

F I G. 14
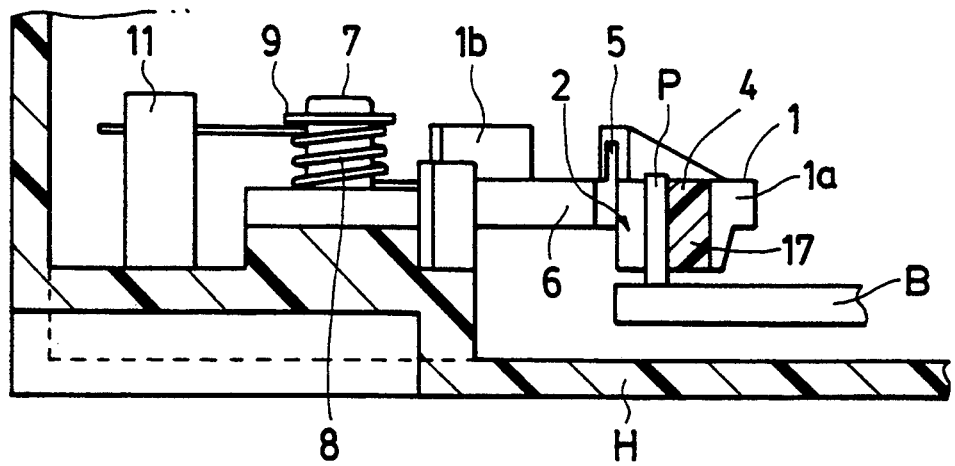
F I G. 15 (A)
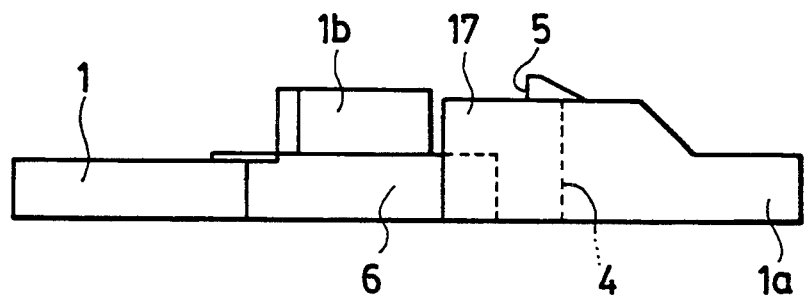
F I G. 15 (B)
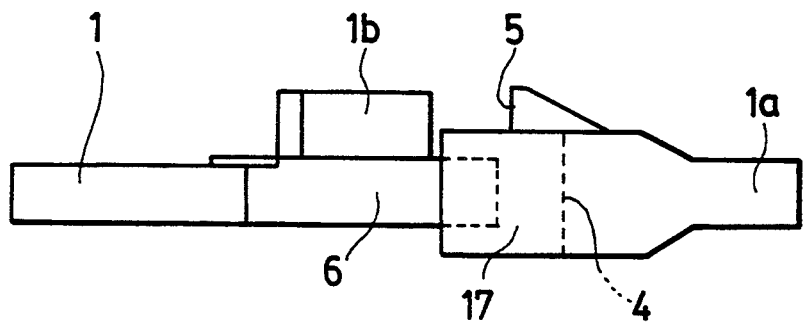

STORAGE DEVICE FURNISHED WITH SAFETY FUNCTION

BACKGROUND OF THE INVENTION

1. Field of the Invention

This invention relates to a so-called push-open type storage device, and particularly to a storing device furnished with a safety function, to be installed as in an instrument panel of an automobile.

2. Description of the Prior Art

Generally, a conventional push-open type storing device of this sort comprises a storing box openably supported in a housing which is provided on an instrument panel side and constantly kept biased in the opening direction thereof by virtue of the pressure of a spring, a cam member provided therein with a cam groove which has an inlet mouth, a locking part and an outlet mouth and rotatably set in place on the housing side, and a pin member adapted to move inside the cam groove of the cam member and set in place on the storing box side. Owing to the construction thereof described above, the conventional device allows the storing box to lock itself in the shutting position thereof inside the housing in spite of the biasing spring pressure by bringing the pin member into engagement with the locking part of the cam groove and then allows the storing box in the locked state to move automatically in the opening direction through the opening part of the housing by pushing the storing box farther inside the housing to thereby release the pin member from the engagement with the locking part of the cam groove.

As illustrated in FIG. 7 and FIG. 8, a cam member 21 used in the conventional device is rotatably kept in place on a shaft 27 on the housing side through a torsion spring 28 and is constantly kept biased in one prescribed direction by the pressure of the torsion spring 28 until it is restrained by a restraining wall 29. Specifically, this cam member 21 is so constructed as to have integrally incorporated therein on one edge side thereof defining its cam groove 22 a locking part 24 and an outlet mouth 25 which are in an extremely approximated state and on the other edge side thereof opposite the aforementioned one edge side a guide wall 26 for a pin member P.

The cam member 21 constructed as described above has been developed exclusively for the purpose of guiding the pin member P in the direction of the outlet mouth 25 by virtue of the function of an inner edge 26a of the guide wall 26. Therefore, the guide wall 26 is so formed that the leading terminal thereof will protrude outward as compared with the position of the locking part 24, namely thrust out in the direction of an inlet mouth 23 of the cam groove 22. In other words, the locking part 24 for securing the pin member P is disposed on the inner side from the leading terminal of the guide wall When the storing box is pushed into the housing, therefore, the pin member P disposed on the rear terminal side of the storing box collides against an outer guide surface 21a of the cam member 21, rotates the cam member 21 and reaches the inlet mouth 23 of the cam groove 22. When the pin member P collides against the guide wall 26 of the cam member 21, then the cam member 21 is slightly rotated in the biasing direction by the pressure of the torsion spring 28 and the pin member P is guided into the cam groove 22 and, as a result, the storing box is retracted by the biasing spring pressure. Thus, the pin member is automatically brought into engagement with the locking part 24 positioned inside the cam groove 22 and locks the storing box infallibly at the shut position inside the housing in spite of the biasing spring pressure as illustrated in FIG. 7.

When the storing box in the locked state is pushed farther into the housing, the pin member P departs from the locking part 24 of the cam groove 22, collides against the inner edge 26a of the guide wall 26 and allows the cam member 21 to be rotated further in the biasing direction (the unlocking direction) as illustrated in FIG. 8. When the storing box is subsequently relieved of this pushing motion, the pin member P is guided in the direction of the outlet mouth 25 of the cam groove 22 and enabled to depart automatically from the cam groove 22 of the cam member 21 and, as a result, the storing box is caused by virtue of the biasing spring pressure to move automatically from the opening part of the housing in the opening direction.

When the storing box which is locked in the shut position thereof with the pin member P kept in engagement with the locking part 24 is exposed to a large inertial force to be generated when the automobile is brought to a sudden stop because of collision or application of brakes, the storing box is moved in the same direction as the direction of inertia. At this time, the pin member P, synchronously with the motion of the storing box and in the same manner as in the open state illustrated in FIG. 8, departs from the locking part 24 and allows the cam member 21 to rotate in the unlocking direction. This fact opens up the possibility of the storing box being accidentally moved through the opening part of the housing in the opening direction by the biasing spring pressure and inflicting damage on the occupant of the automobile.

In recent years, therefore, the practice of furnishing the push-open type storing device in particular with a safety function for the prevention of this accident has become an obligatory measure.

Such a storing device furnished with a safety function is disclosed in Japanese Utility Model Public Disclosure No. 2-25332, for example.

This prior art storing device furnished with the safety function, though omitted from illustration herein, comprises a guide piece integrally extended from the rear terminal part of a cam member similar in shape to the conventional cam member 21 described above, an inertia-responding member slidably disposed on the guide piece, a tension spring adapted to draw the inertia-responding member in the direction of the rear terminal part of the cam member, and a lock cylinder adapted to allow entry therein of the terminal part of the inertia-responding member and formed in the relevant part of the housing.

Therefore, the prior art device is used similarly in the normal service to the conventional push-open type storing device. When the storing box which is kept locked in its shut position is exposed to a large inertial force as when the automobile is brought to a sudden stop by collision or application of brakes, therefore, this device operates so that the terminal part of the inertia-responding member disposed on the guide piece of the cam member thrusts into the lock cylinder in spite of the drawing force of the tension spring and inhibits the cam member from rotating in the unlocking direction and, as a result, prevents the storing box from thrusting out of the housing through the opening part thereof.

The prior art storing device furnished with the safety function not only necessitates incorporation therein as an extra component of the inertia-responding member separately of the cam member but also requires the guide piece to be integrally extended from the rear terminal part of the cam member, the inertia-responding member to be disposed on the guide piece as vested with the drawing force of the tension spring, and the lock cylinder to be formed separately on the housing side as adapted to allow entry therein of the terminal part of the inertia-responding member. This construction, therefore, automatically entails an increase in the number of component parts and an uncalled-for addition to the cost, complexity, and size of the storing device and suffers consequently from the serious problem of increasing the number of works involved in the assembly and jeopardizing the efficiency of the operation of assembly.

The prior art storing device further has the possibility of lacking reliability of performance because of the undeniable phenomenon that when the unlocking stroke of the storing box is short, the cam member rotates in the unlocking direction and accidentally thrusts the storing box outside before the inertia-responding member begins to move on the guide piece.

In the light of the problems encountered by the prior art storing device furnished with the safety function and intended for use in an automobile as described above, the major object of this invention is to provide a storing device for use in an automobile which infallibly manifests a safety function without necessitating use of an independent part intended exclusively for that purpose.

SUMMARY OF THE INVENTION

To accomplish the object, according to this invention there is provided a storing device with a safety function and for use in an automobile, which comprises a storing box openably supported in a housing having an opening, a spring provided between the storing box and the housing for constantly biasing the storing box in an opening direction, a cam member rotatably set in place on the housing side and provided on an outside thereof with a guide surface and on an inside thereof with a cam groove which has an inlet mouth, a locking part and direction, a cam member rotatably set in place on the housing side and provided on an outside thereof with a guide surface and on an inside thereof with a cam groove which has an inlet mouth, a locking part and an outlet mouth, and a pin member set in place on the storing box side for moving along the guide surface of the cam member, entering the inlet mouth of the cam groove and engaging with the locking part of the cam groove to lock the storing box in a shut position inside the housing against the biasing force of the spring when a first pushing force is applied to the storing box and for moving inside the cam groove to be released from the engagement with the locking part of the cam groove and brought to the outlet mouth of the cam groove, thereby moving the storing box automatically in the opening direction through the opening of the housing when a second pushing force is applied for moving the locked storing box further into the housing, the locking part and the outlet mouth of the cam groove being formed as separated with a distance from each other on one edge side of the cam member defining the cam groove, the other edge side of the cam member opposite the one edge side thereof being provided integrally with a projecting stopper guide wall at a position between the locking part and the outlet mouth of the cam groove so that the locking part of the cam groove is positioned outwardly from the stopper guide wall of the cam member, whereby the pin member is enabled to collide against an outer edge of the stopper guide wall of the cam member and prevent the storing box from being thrust out of the housing when the storing device is exposed to a large inertial force.

The above and other objects, characteristic features and advantages of the present invention will become more apparent to those skilled in the art from the detailed description of the present invention given hereinbelow with reference to the accompanying drawings.

BRIEF DESCRIPTION OF THE DRAWINGS

FIG. 14 is a cross section illustrating the state of engagement between a pin member and a locking part of the second example of the cam member.

FIG. 15(A) is a side view illustrating a third example of the cam member usable for this invention.

FIG. 15(B) is a side view illustrating a fourth example of the cam member usable for this invention.

DETAILED DESCRIPTION OF THE PREFERRED EMBODIMENTS

The present invention will now be described in detail below with reference to the first embodiment thereof illustrated in FIGS. 1 to 6.

The storing device furnished with the safety function and intended for use in an automobile as contemplated by the present invention comprises a storing box B openably supported pivotally in a housing H provided on an instrument panel side and constantly kept biased in the opening direction thereof by virtue of the pressure of a spring 12, a cam member 1 rotatably set in place on the housing side, and a pin member P adapted to move inside a cam groove 2 of the cam member 1 and set in place on the storing box side. Owing to the construction described above, the storing device of this invention allows the storing box B to lock itself in the shut position thereof inside the housing H in spite of the biasing spring pressure by bringing the pin member P into engagement with a locking part 4 of the cam groove 2 and then allows the storing box B in the locked state to move automatically in the opening direction through an opening part of the housing H by pushing the storing box B further inside the housing H to thereby releasing the pin member P from the engagement with the locking part 4 of the cam groove 2.

The present invention, unlike the prior art storing device which manifests the safety function by the use of an inertia-responding member and an accessorial part thereof formed separately of the cam member, has been developed on the basis of a new concept of manifesting the safety function by imparting an alteration to the cam member 1.

Figure 1:
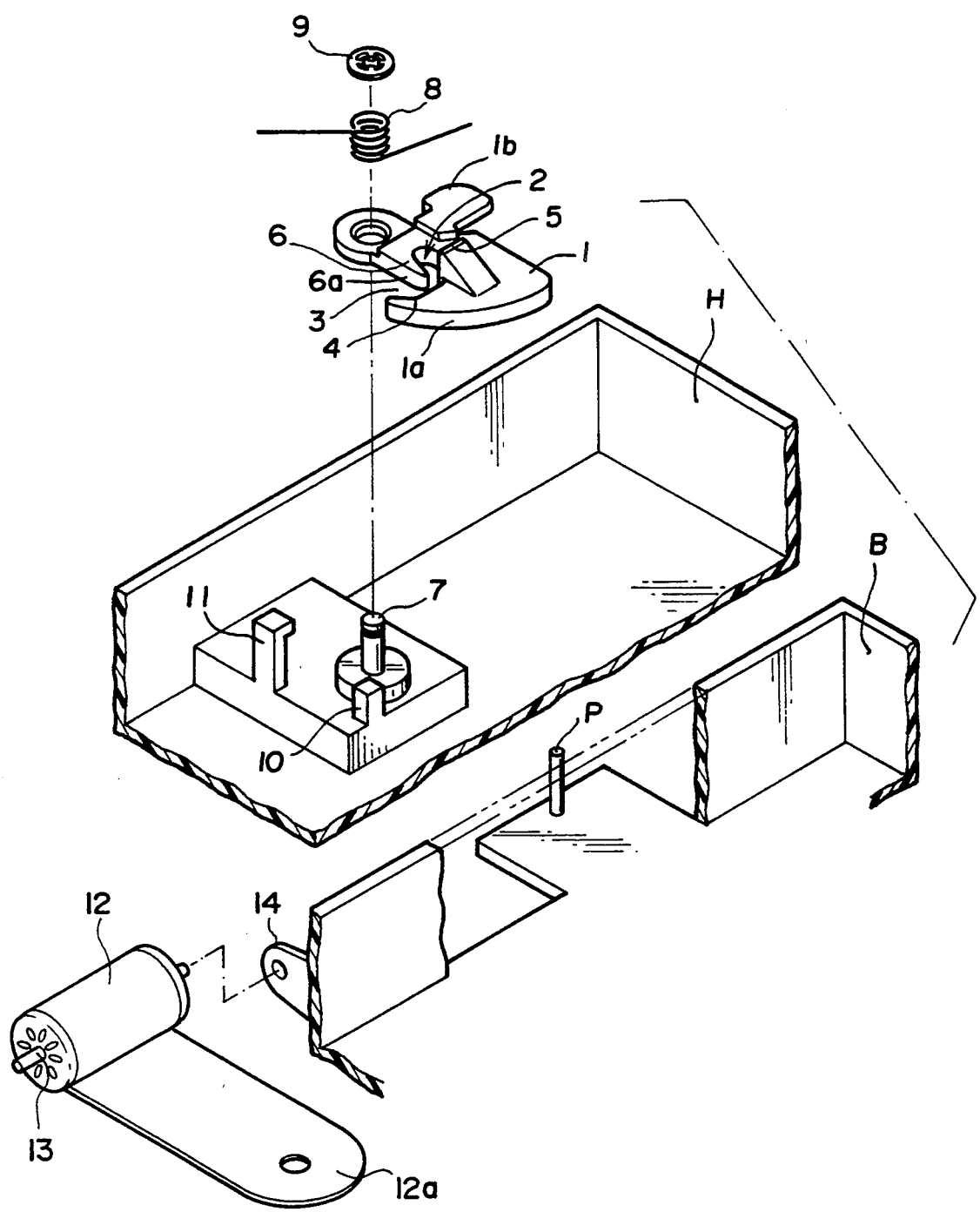
FIG. 1 is an exploded perspective view illustrating the essential part of a storing device furnished with a safety function as a first embodiment of this invention.

To be more specific, the cam member 1 used in this embodiment is an integrally formed article of synthetic resin. As illustrated in FIG. 1, the cam member 1 is provided therein with the cam groove 2 having an inlet mouth 3, the locking part 4 and an outlet mouth 5, supported rotatably on a shaft 7 on the housing H side through a torsion spring 8 and a washer 9, and kept biased constantly in a given direction by the pressure of the torsion spring 8. This cam member 1 is characterized in that the locking part 4 and the outlet mouth 5 are formed as separated with an appreciable distance from each other on one edge side defining the cam groove 2, that a projecting stopper guide wall 6 shaped approximately like the letter V is formed integrally between the locking part 4 and the outlet mouth 5 on the other edge side opposite the aforementioned one edge side, and that the locking part 4 for securing the pin member P is positioned outwardly from the leading terminal part of the stopper guide wall 6.

In this embodiment, owing to the positional relation described above, the gap which occurs between the leading terminal part of the stopper guide wall 6 and the one edge of the cam groove 2 during the normal opening operation allows the pin member P to be moved in the direction of the outlet mouth 5 of the cam groove 2 and the inertial force, when exerted on the storing device, causes the pin member P to collide against an outer edge 6a of the stopper guide wall 6 and inhibits the pin member P from moving in the direction of the outlet mouth 5 of the cam groove 2.

In FIG. 1, reference numeral 10 stands for a regulating wall which serves the purpose of regulating the position at which the cam member 1 is urged into a rotation, numeral 11 for a securing wall which co-operates with an arm part 1b of the cam member 1 to secure in position the terminal part of the torsion spring 8, and numeral 12 for a constant pressure spring for biasing the storing box B in its opening direction at all times. The constant pressure spring 12 is wound on a winding shaft 13, which is fixed to the rear terminal end of the storing box B via a retaining part 14, so that the free end 12a of the spring 12 to be fixed to the bottom surface of the housing H in the vicinity of its opening part with a bolt or the like fastening means is retreated toward the winding shaft 13.

Figure 2:
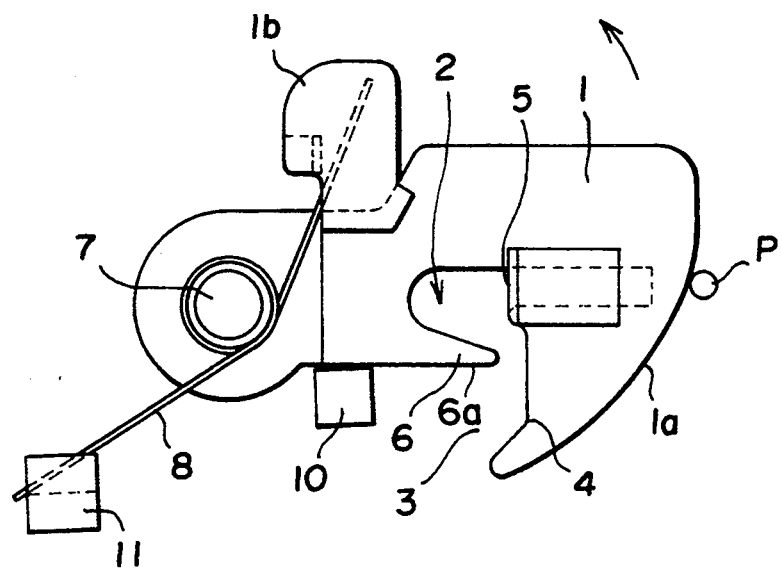
FIG. 2 is an explanatory view illustrating the initial state of the storing device with a storing box into a housing.

In the normal use of the storing device constructed as described above, therefore, when the storing box B is pushed into the housing H against the biasing force of the constant pressure spring 12, the pin member P formed on the rear terminal part side of the storing box B collides against an outer guide surface 1a of the cam member 1 as illustrated in FIG. 2 and advances while rotating the cam member 1 in spite of the pressure of the torsion spring 8 and eventually reaches the inlet mouth 3 of the cam groove 2.

Figure 3:
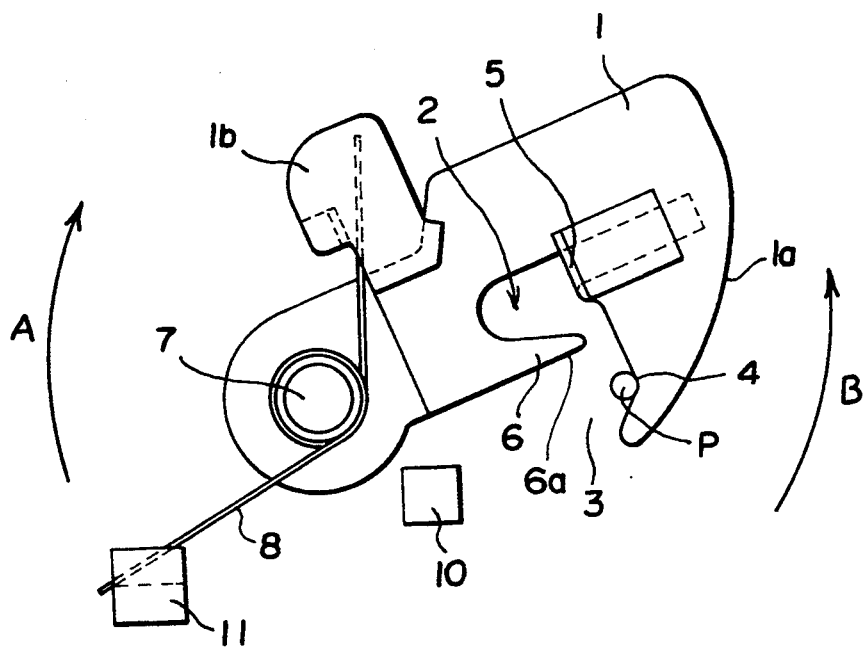
FIG. 3 is an explanatory view illustrating the state of the storing device having a pin member secured in a locking part of a cam member.

As a result, the cam member 1 is now rotated slightly in the biasing direction by the pressure of the torsion spring 8 and the pin member P is consequently guided into the cam groove 2. At this time, since the storing box B is slightly retracted similarly by the biasing force of the constant pressure spring 12, the pin member P is automatically engaged with the locking part 4 of the cam groove 2 as shown in FIG. 3 owing to the positional relation mentioned above and locks the storing box B infallibly at the shut position inside the housing H against the biasing force of the constant pressure spring 12.

Figure 4:
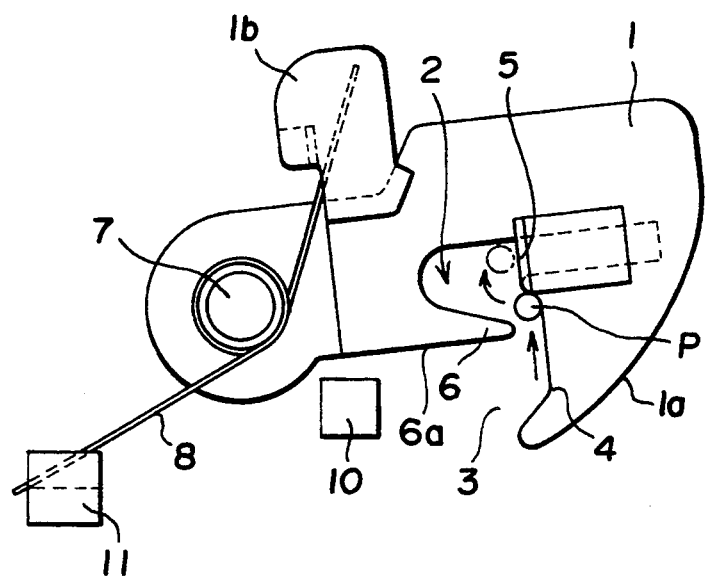
FIG. 4 is an explanatory view illustrating the state of the storing device with the pin member released from the locking part of the cam member.
Figure 5:
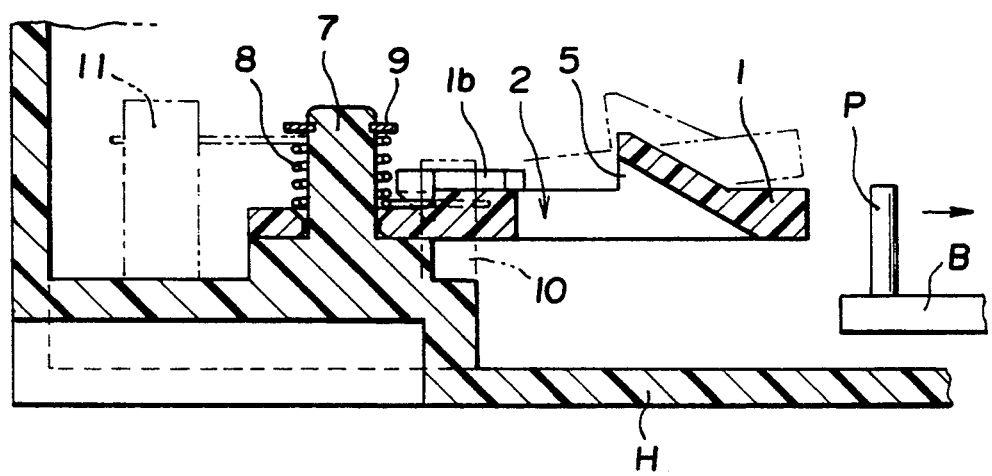
FIG. 5 is a cross section illustrating the essential part of the storing device in the state in which the storing box has been moved in the opening direction.
Figure 6:
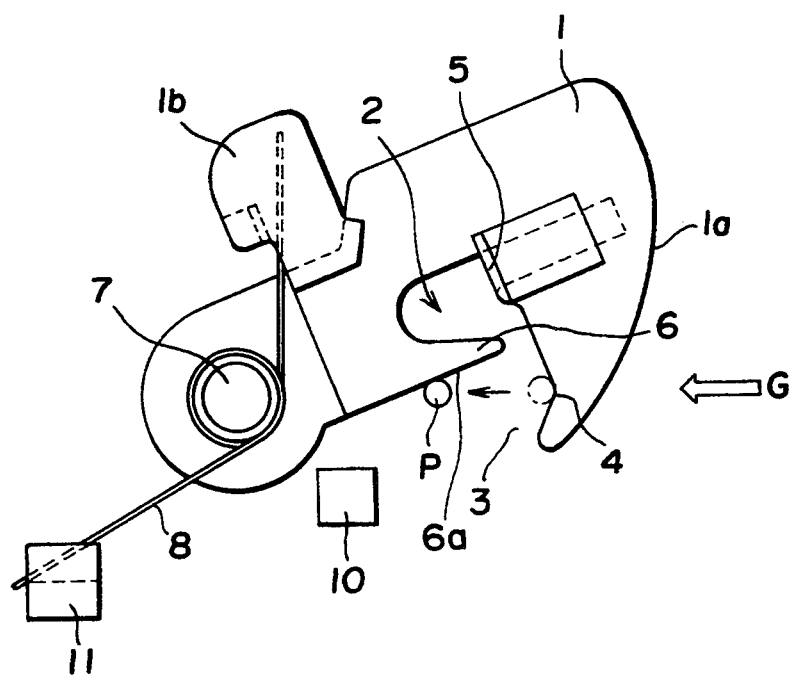
FIG. 6 is an explanatory view illustrating the state of the storing device in which the safety function has been fulfilled.
Figure 7:
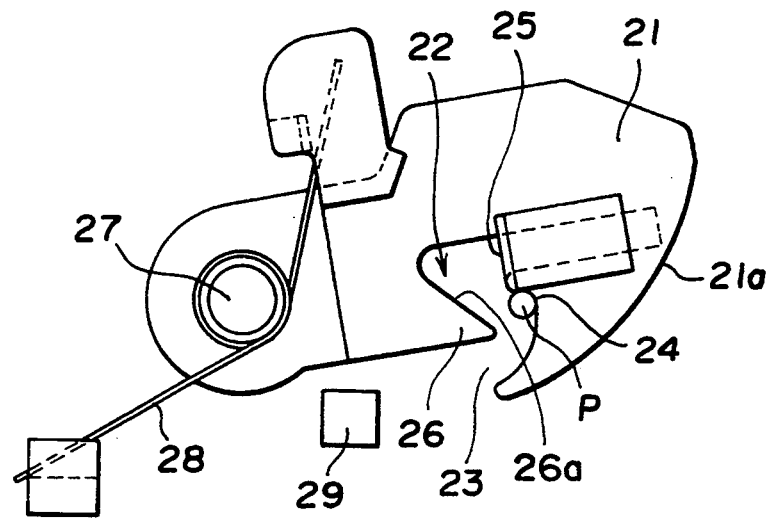
FIG. 7 is an explanatory view illustrating the state of a prior art storing device with a pin member secured in a locking part of a cam member.
Figure 8:
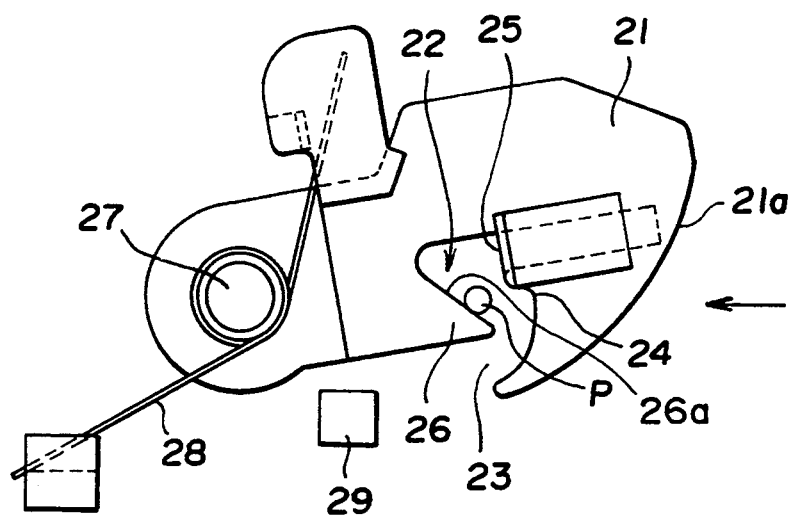
FIG. 8 is an explanatory view illustrating the state of the prior art storing device with the pin member released from the locking part of the cam member.

When the storing box B in the locked state is further pushed into the housing H, the pin member P releases itself from the locking part 4 of the cam groove 2 as shown in FIG. 4 and rotates the cam member 1 further in the biasing direction (the unlocking direction). When the pushing action on the storing box B is discontinued, the pin member P follows the same path as in the case of the prior art device, passes through the outlet mouth 5, and releases itself automatically from the cam groove 2 of the cam member 1 as shown in FIG. 5. As a result, the storing box B is enabled to automatically move in the opening direction through the opening part of the housing H by virtue of the biasing force of the constant pressure spring 12.

When the storing box B remaining in the locked state at the shut position thereof is exposed to a large inertial force G (FIG. 6) when the automobile is brought to a sudden stop by collision or application of brakes, the pin member P is moved in conjunction with the storing box B in the same direction as the direction of the inertial force similarly to that in the prior art storing device. At this time, the pin member P is caused to collide instantaneously against the outer edge 6a of the stopper guide wall 6 and infallibly inhibited from moving in the direction of the outlet mouth 5 of the cam groove 2. As a result, the cam member 1 is completely prevented from rotating in the unlocking direction and the storing box B is retained in the shut position inside the housing H and the possibility of the storing box B accidentally thrusting out of the housing H is eliminated.

Specifically in the light of the fact that, during the normal opening operation, the cam member 1 is caused to rotate in the unlocking direction and the pin member P is allowed to move in the direction of the outlet mouth 5 of the cam groove 2 and, on exposure of the storing device to a sudden inertial force G, the speed of motion of the pin member P exceeds the speed of rotation of the cam member 1 in the unlocking direction, the present embodiment has succeeded in enabling the storing device to manifest a necessary safety function simply by adopting an extremely simple construction of forming the stopper guide wall 6 on the edge side defining the cam groove 2 and causing the locking part 4 to be positioned outwardly from the stopper guide wall 6.

When the inertial force G mentioned above ceases to exist, the storing box B is moved to the formerly occupied position by virtue of the biasing force of the constant pressure spring 12. At this time, the pin member P is guided by the outer edge 6a of the stopper guide wall 6, led to the locking part 4 positioned more outwardly than the stopper guide wall 6, and brought into engagement automatically with the locking part 4. As a result, the cam member 1 is prevented from being rotated in the unlocking direction and the storing box B is retained at the shut position inside the housing H.

Figure 10:
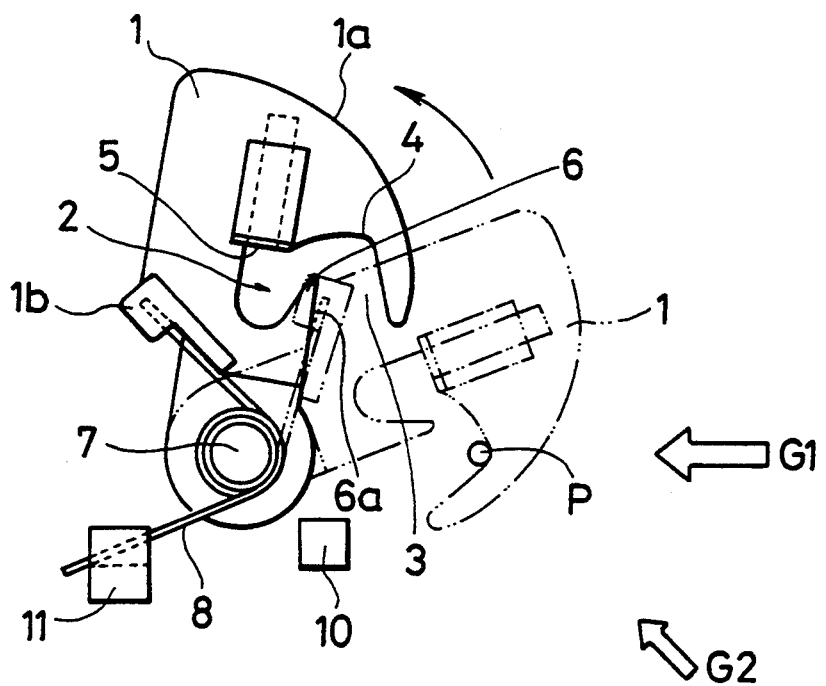
FIG. 10 is an explanatory view showing the state of a cam member having overrun its position allotted.
Figure 11:
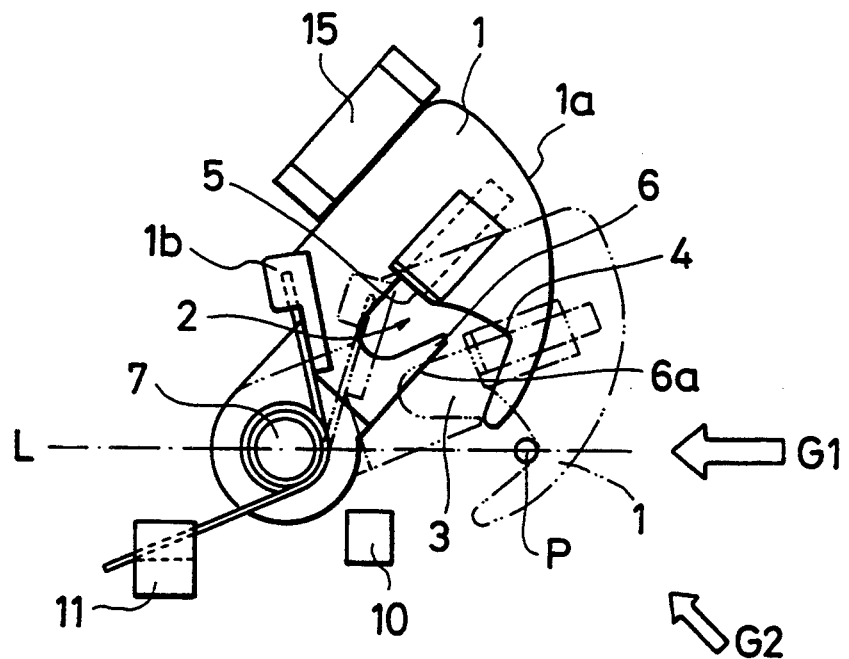
FIG. 11 is an explanatory view showing the state of the cam member being prevented from overrunning the allotted position by the second embodiment of this invention.

The second embodiment of the storing device furnished with the safety function according to the present invention will be described with reference to FIGS. 9 to 11.

Figure 9:
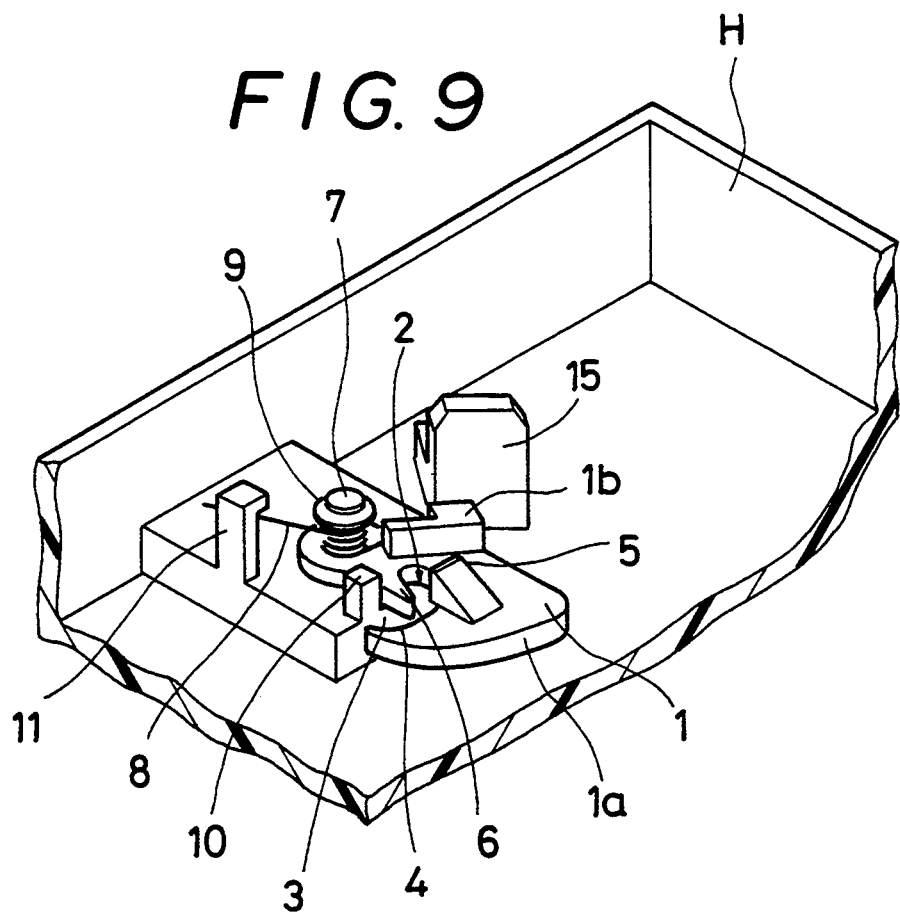
FIG. 9 is a perspective view illustrating the essential part of a storing device furnished with a safety function as a second embodiment of this invention.

As shown in FIG. 9, the second embodiment provides the first embodiment with a second regulating wall 15 formed on the housing H at a position opposite the position of the regulating wall 10 which serves to regulate the position of the cam member 1 urged into a rotation by the torsion spring 8, so that it serves the purpose of regulating its rotation in the direction opposite the direction in which the torsion spring 8 biases the cam member 1, i.e. its rotation in the direction in which the pin member P is detached from the inlet mouth 3 of the cam groove 2.

The structure of the first embodiment will suffice if the inertial force G is as large as that normally expected when an automobile is brought to a sudden stop by collision or application of brakes. However, in the case of a much larger inertial force G1 than expected or such an inertial force G2 as exerted slantwise, as shown in FIG. 10, there is a fair possibility of the cam member 1 overrunning its allotted position in the direction (shown by solid arrow in FIG. 10 and hereinafer referred to as the opposite direction) opposite the direction in which the torsion spring 8 biases the cam member 1 due to the fact that the center of gravity of the cam member 1 is on its leading end side. This overrunning will result in detachment of the pin member P from the inlet mouth 3 of the cam groove 2. As illustrated in FIG. 11, the provision of the second regulating wall 15 can eliminate such a possibility as described above.

The position of the second regulating wall 15 for regulating the the amount of rotation of the cam member in the opposite direction will be described more specifically.

As described in the first embodiment with reference to FIG. 2, it is necessary to rotate the cam member 1 in the opposite direction to guide the pin member P into cam groove 2 via the inlet mouth 3 in order to lock the storing box B at its shut position. Therefore, it is not permissible for the leading end of the outer guide surface 1a of the cam member 1 defining the inlet mouth 3 of the cam groove 2 to thrust outside the locus L of movement of the pin member P (the side lower than the locus L in FIG. 11). For this reason, the position of the second regulating wall 15 is required to permit the necessary amount of rotation of the cam member 1 in the opposite direction and allow the leading end of the outer guide surface 1a of the cam member 1 to be inside (the side higher than the locus L in FIG. 11) and in the vicinity of the locus L on which the pin member P can be smoothly guided into the inlet mouth 3 of the cam groove 2.

According to the second embodiment, therefore, even if the inertial force G1 or G2 should act to urge the cam member 1 to a great extent in the opposite direction, the cam member 1 will collide against the second regulating wall 15 and then be rotated owing to the biasing force of the torsion spring 8 to receive the pin member P urged to retract by the spring pressure of the constant pressure spring 12. Thus, it is possible to prevent the pin member P from being accidentally detached from the inlet mouth 3 of the cam groove 2 of the cam member 1 and, therefore, the safety function of the second embodiment is superior to that of the first embodiment.

Figure 12:
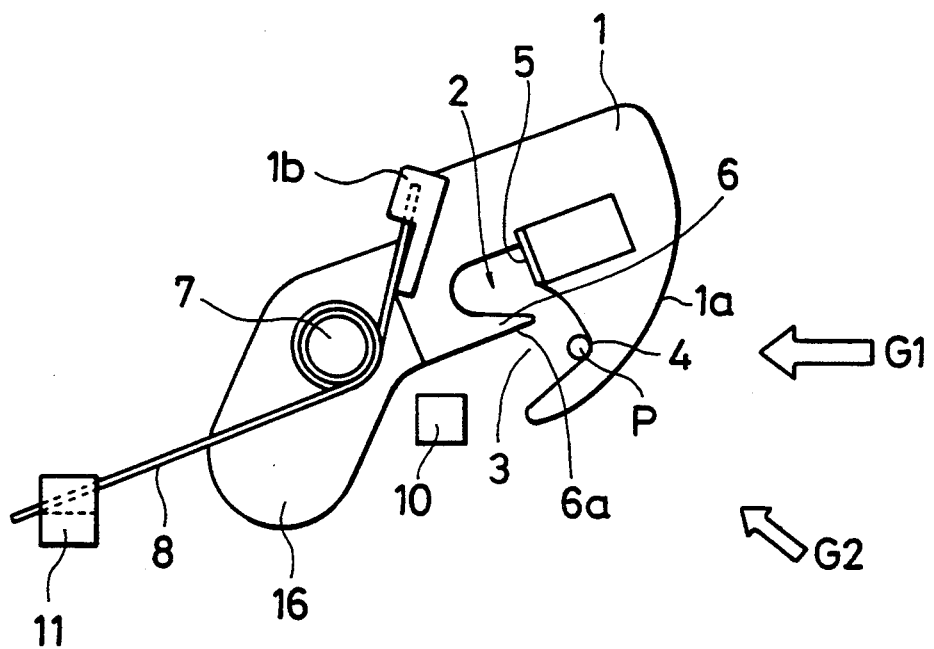
FIG. 12 is a plan view illustrating the essential part of a storing device furnished with a safety function as a third embodiment of this invention.

The third embodiment of the storing device furnished with the safety function according to the present invention will be described with reference to FIG. 12.

The third embodiment is proposed to have the same safety function as that of the second embodiment and provides the cam member 1 with an integral adjustment part 16 for causing the center of gravity of the cam member 1 and the axis of rotation of the cam member, i.e. the center of the shaft 7, to coincide with each other in place of the provision of the second regulating wall 15 in the second embodiment.

The shape, size and thickness of the adjustment part are suitably determined so that the center of gravity and the axis of rotation of the cam member 1 coincide with each other. However, a separate weight (not shown) may be attached to the cam member 1 in place of the integral adjustment part 16.

According to the third embodiment, even if the inertial force G1 or G2 should act to urge the cam member 1 in the opposite direction, since the center of gravity of the cam member 1 is on the shaft 7, it is possible to prevent the cam member 1 from overrunning in the opposite direction. Therefore, there can be eliminated a possibility that the pin member P is accidentally detached from the inlet mouth 3 of the cam groove 2 of the cam member 1, the detachment of the pin member P causing the storing box B to be accidentally moved in its open direction from the opening of the housing H, the movement of the storing box B causing the driver or passengers to be injured.

The storing devices with the safety function described above as the first to third embodiments of the present invention have been developed in view of the impact applied to the front side of an automobile. A storing device is desired to have a safety function to cope with the impact applied to not only the front side but also the rear side of the automobile for the following reasons.

Returning to FIG. 6, when an impact is applied to the front side of an automobile, the inertial force G generated consequently causes the storing box B to advance in company with the pin member P and, therefore, a load exerted on the cam member 1 is not so large.

However, when an impact is applied to the rear side of the automobile, the housing H and the automobile body are moved to advance together, whereas the storing box B openably and closably supported in the housing H is caused to maintain its position intact with the aid of the action of the constant pressure spring 12.

Consequently, there occurs a phenomenon like the action of causing the housing H and the storing box B to be away from each other. When such a phenomenon occurs, a large load is exerted on the locking part 4 of the cam member 1 to damage or break the locking part 4 and/or part of the cam member 1 in the vicinity of the locking part 4. This causes the storing device to malfunction. Even when the locking part 4 is protected from being damaged or broken, the large load exerted on the locking part 4 causes the pin member P to be inclined to cause upward escape of the leading end of the cam member 1 and ready detachment of the pin member P from the locking part 4 of the cam member 1. Consequently, the storing box B is thrust out of the opening of the housing H to injure the driver or passengers.

Figure 13A:
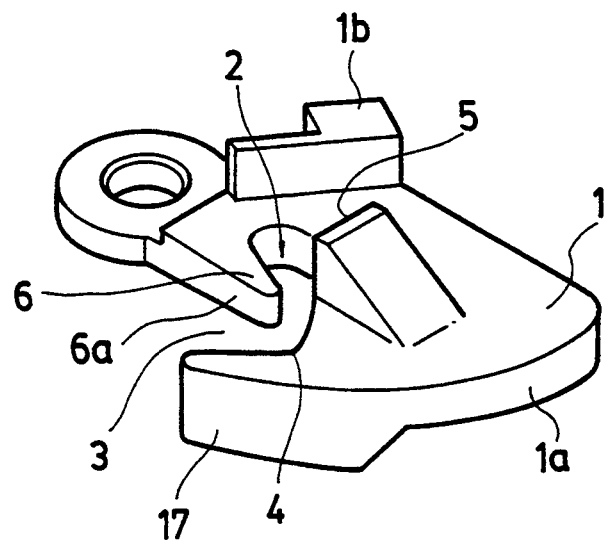
FIG. 13(A) is a perspective view illustrating a second example of the cam member usable for this invention as seen from above.
Figure 13B:
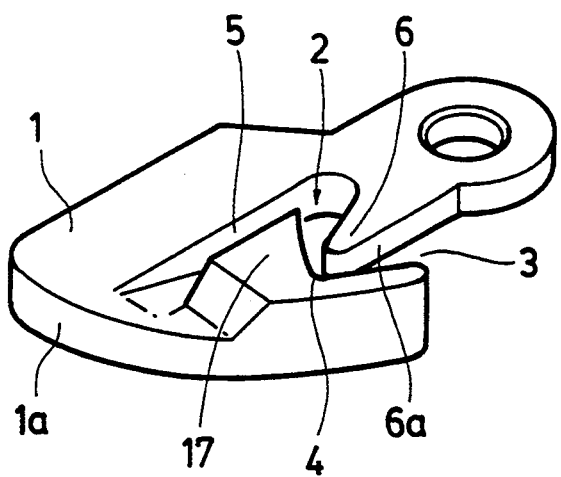
FIG. 13(B) is a perspective view illustrating the second example of the cam member as seen from below.

In view of the above, according to the present invention there is provided a cam member 1 having a thick-wall portion 17 formed on the lower side thereof at and in the vicinity of its locking part 4 as illustrated in FIGS. 13(A) and 13(B) to reinforce the locking part 4. This cam member 1 may be used as that of any one of the first to three embodiments.

When the storing box B is locked in its shut position, as shown in FIG. 14, the pin member P of the storing box B is engaged in the locking part 4 of the cam groove 2. In this state, when the rear side of the automobile is exposed to collision against another automobile during its running or any existing article during its back operation to cause such a phenomenon as described above, a great load is exerted on the locking part 4 in which the pin member P is engaged. However, since the locking part 4 is reinforced with the thick-wall portion 17, it is protected from being damaged or broken. Further, since the pin member P is brought into large-surface engagement with the locking part 4 reinforced with the thick-wall portion 17, the pin member P is prevented from inclination and the leading end of the cam member 1 is prevented from escaping upward. Therefore, it is possible to hold the storing box B locked at its shut position and prevent it from thrust outwardly from the opening of the housing H.

The thick-wall portion 17 shown in FIGS. 13 and 14 is formed on the lower side of the cam member 1. However, this is by no means limitative from the standpoint of reinforcement of the locking part 4. That is, it may be formed on the upper side or on both the upper side and the lower side of the cam member 1 as illustrated in FIGS. 15(A) and 15 (B).

However, the thick-wall portion 17 formed on the lower side of the cam member 1 is preferable because the pin member P comes into contact from its free end to its base end with the thick-wall portion 17 to prevent the pin member P from being inclined and the leading end of the cam member 1 from escaping upward.

The embodiments described thus far represent a case in which the storing box B is adapted to be opened and shut linearly relative to the housing H. This invention is not limited to this particular type of the storing box. It goes without saying that this invention can be easily applied without departing from the spirit of this invention to a rotary storing box which is opened by being rotated downwardly and shut by being rotated upwardly, for example.

As described above, the present invention allows the push-open type storing device thereof to manifest the safety function to the literally fully extent by simply imparting an alteration to the cam member unlike the prior art storing device which is furnished with the safety function relying on the use of an inertia-responding member and an accessorial part thereof. Thus, the storing device of this invention has absolutely no use for a special part adapted exclusively to manifest the safety function under discussion.

This invention, therefore, contributes in a great measure to simplification and miniaturization of the storing device, consequently allows a decrease in the number of works involved in the assembly of the storing device, and therefore contributes to lowering the cost of the storing device.

Further, the construction of causing the pin member to collide against the outer edge of the stopper guide wall of the cam member during the presence of the inertial force ensures infallible prevention of the cam member from being rotated in the unlocking direction. Thus, the storing device of this invention enjoys notable improvement in the reliability of performance as compared with the prior art storing device.

Furthermore, provision of the second regulating wall on the housing or of the adjustment part on the cam member can manifest an infallible safety function even when an inertial force larger than expected or in the slant direction is exerted.

Moreover, since the locking part of the cam member is provided with a thick-wall portion, if a large load is exerted on the locking part when the rear side of an automobile is exposed to collision, the locking part or its neighboring part can be protected from a damage. Since the pin member and the locking part are brought into engagement with each other over a wide area in the presence of the thick-wall portion, they exhibit large apparent rigidity to eliminate inclination of the pin member or upward escape of the leading end of the cam member. Therefore, it is possible to prevent the storing box from accidentally thrusting outward.

What is claimed is:

1. A storing device comprising:
    a housing having an opening;
    a storing box movably mounted in said housing for movement between an open position in which said storing box extends outwardly of said opening, and a closed position in which said storing box is situated substantially within said housing;
    a first spring interposed between said storing box and said housing and biasing said, storing box in an opening direction toward said open position;
    a cam member pivotably mounted to said housing, a cam groove being formed in said cam member, and a cam surface being formed along an outer surface of said cam member, said cam groove including an inlet mouth, a locking part and an outlet mouth, and being defined between opposing groove sidewalls;
    a second spring interposed between said cam member and said housing and biasing said cam member in a first pivotal direction;
    a pin member mounted on said storing box so as to travel along a predetermined path when said storing box is moved between its open and closed positions;
    wherein said pin member constitutes a means for pivoting said cam member in a second pivot direction against a bias force of said second spring when said storing box is moved from said open position toward said closed position, by engaging and riding along said cam surface of said cam member;

wherein said second spring constitutes a means for pivoting said cam member in said first pivotal direction when said pin member is positioned at said inlet mouth of said cam groove, so as to cause said pin member to enter into said cam groove;

wherein said first and second springs together constitute means for causing said pin member to engage in a predetermined locking position at said locking part of said cam groove and to remain at said locking position absent external forces against said storing box and said housing, and for causing said pin member to disengage from said locking position, ride along said cam groove toward said outlet mouth and exit said cam groove through said outlet mouth when an external force is imposed on said storing box in a closing direction opposite said opening direction and then released;

wherein said locking part of said cam groove forms part of one of said opposing groove sidewalls; and wherein said cam member further includes a projecting stopper guide having first and second faces which form part of the other of said opposing groove sidewalls, said first face facing said outlet mouth of said cam groove and said second face facing said pin member when said pin member is in said locking position.

2. A storing device as recited in claim 1, further comprising
a first restraining wall mounted to said housing for limiting an extent of pivotal motion of said cam member in said first pivotal direction.

3. A storing device as recited in claim 2, further comprising
a second restraining wall mounted to said housing for limiting an extent of pivotal motion of said cam member in said second pivotal direction.

4. A storing device as recited in claim 1, further comprising
a restraining wall mounted to said housing for limiting an extent of pivotal motion of said cam member in said second pivotal direction.

5. A storing device as recited in claim 1, wherein
a center of gravity of said cam member is coincident with a center of pivotal rotation of said cam member.

6. A storing device as recited in claim 1, wherein
said cam member is thicker at said locking part than at a major portion of a remainder of said cam member.

7. A storing device comprising:
a housing having an opening;
a storing box movably mounted in said housing for movement between an open position in which said storing box extends outwardly of said opening, and a closed position in which said storing box is situated substantially within said housing;
a first spring interposed between said storing box and said housing and biasing said storing box in an opening direction toward said open position;
a cam member pivotably mounted to said housing, a cam groove being formed in said cam member, and a cam surface being formed along an outer surface of said cam member, said cam groove including an inlet mouth, a locking part and an outlet mouth;

a second spring interposed between said cam member and said housing and biasing said cam member in a first pivotal direction;

a pin member mounted on said storing box so as to travel along a predetermined path when said storing box is moved between its open and closed positions;

wherein said pin member constitutes a means for pivoting said cam member in a second pivot direction against a bias force of said second spring when said storing box is moved from said open position toward said closed position, by engaging and riding along said cam surface of said cam member;

wherein said second spring constitutes a means for pivoting said cam member in said first pivotal direction when said pin member is positioned at said inlet mouth of said cam groove, so as to cause said pin member to enter into said cam groove;

wherein said first and second springs together constitute means for causing said pin member to engage in a predetermined locking position at said locking part of said cam groove and to remain at said locking position absent external forces against said storing box and said housing, and for causing said pin member to disengage from said locking position, ride along said cam groove toward said outlet mouth and exit said cam groove through said outlet mouth when an external force is imposed on said storing box in a closing direction opposite said opening direction and then released;

wherein said first and second springs further constitute means for causing said pin member to automatically exit from said cam groove through an end of said cam groove opposite said inlet mouth when said pin member is positioned in said outlet mouth; and wherein said cam member further includes a projecting stopper guide which, when viewed in a direction along said predetermined path of said pin member, is disposed between said outlet mouth of said cam groove and said pin member when said pin member is in said locking position.

8. A storing device as recited in claim 7, further comprising
a first restraining wall mounted to said housing for limiting an extent of pivotal motion of said cam member in said first pivotal direction.

9. A storing device as recited in claim 8, further comprising
a second restraining wall mounted to said housing for limiting an extent of pivotal motion of said cam member in said second pivotal direction.

10. A storing device as recited in claim 7, further comprising
a restraining wall mounted to said housing for limiting an extent of pivotal motion of said cam member in said second pivotal direction.

11. A storing device as recited in claim 7, wherein
a center of gravity of said cam member is coincident with a center of pivotal rotation of said cam member.

12. A storing device as recited in claim 7, wherein
said cam member is thicker at said locking part than at a major portion of a remainder of said cam member.

* * * * *